UNITED STATES PATENT OFFICE.

JEAN V. SKOGLUND, OF BROOKLYN, ASSIGNOR TO MARTIN KALBFLEISCH'S SONS COMPANY, OF NEW YORK, N. Y.

ALUMINOUS CAKE AND PROCESS OF MAKING SAME.

SPECIFICATION forming part of Letters Patent No. 526,205, dated September 18, 1894.

Application filed November 28, 1893. Serial No. 492,275. (No specimens.)

*To all whom it may concern:*

Be it known that I, JEAN V. SKOGLUND, a subject of the King of Sweden and Norway, residing at Brooklyn, in the county of Kings and State of New York, have invented a new and useful Improvement in Sizing Agents, to be Used for Sizing Paper-Pulp, of which the following is a specification.

To produce a paper pulp that will not discolor, it is necessary to employ for the sizing of the pulp a compound of oxid of aluminum free from iron, or if iron is contained it must be in a ferrous state. The reason for this is that ferric compounds impart to the pulp a darkened or reddish color.

The object of my invention is to convert all the iron existing in the sulfate of aluminum into ferrous iron without the introduction of heavy metals or impurities in objectionable quantities. To accomplish this, I use a stannous compound by which I reduce all ferric iron into ferrous iron, thereby removing every trace of ferric iron. The following formula shows the chemical reaction:

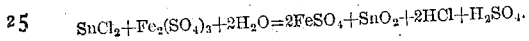

The stannic oxid does not dissolve in the excess of free acid when sulfates or free sulfuric acids are present, especially when the solution is hot. In this manner all the tin is precipitated, yielding a pure product. Instead of using stannous chlorid I may use stannous sulfate or other stannous compounds, such as stannous oxid or hydrate. The price of tin being high, renders the process expensive unless the precipitated tin is regained and used over again. For this reason I first reduce most of the iron with another and cheaper agent, such as sulfurous acid or its salts, or a hypo-sulfite or any other known reducing agent. None of these reducing agents are so active as the stannous compounds. Consequently it is difficult in using them to reduce all the iron, especially when the liquid containing the iron is concentrated. When so much of the ferric iron is reduced as to leave only a trace of unreduced ferric iron, I add the stannous compound in an estimated quantity in order to entirely reduce the remaining portion of the ferric iron.

The method of making the sizing agent is as follows: The bauxite or similar material containing more or less iron is treated with sulfuric acid to dissolve the oxid of aluminum. The iron also enters the solution. To this solution I add the weaker reducing agent, preferably a sulfite or sulfurous acid, and heat it until the reducing action is nearly completed. I then add an estimated quantity of a stannous compound, preferably stannous chlorid or sulfate, and continue the boiling or heating until all of the ferric iron is reduced. The reducing action is facilitated by the boiling or heating. If the tin solution has been added in excess, it may be precipitated with hydrogen sulfid or any other suitable agent.

Having thus described my invention, I claim as new, and desire to secure by Letters Patent—

1. An aluminous cake, consisting of sulfate of alumina, ferrous iron, an excess of a stannous compound, and a stannic compound, as herein specified.

2. The method of reducing ferric iron in solution with aluminum sulfate, which consists in first reducing the greater portion of the ferric iron by means of a weaker reducing agent, such as a sulfite or sulfurous acid, and finishing the reduction with any stannous compound, substantially as specified herein.

3. The process for reducing aluminum sulfate free from ferric iron, which consists in treating the crude material, such as bauxite, with sulfuric acid to dissolve the aluminum oxid and the iron oxid, adding a weaker reducing agent such as sulfurous acid or a sulfite, then heating the solution, and finally adding any stannous compound, and continuing the heating until all of the ferric iron is reduced, substantially as specified herein.

JEAN V. SKOGLUND.

Witnesses:
E. M. CLARK,
C. SEDGWICK.